United States Patent [19]

Musha

[11] 4,386,823
[45] Jun. 7, 1983

[54] OBJECTIVE LENS DRIVING DEVICE

[75] Inventor: Toru Musha, Hachioji, Japan

[73] Assignee: Olympus Optical Co. Ltd., Tokyo, Japan

[21] Appl. No.: 217,117

[22] Filed: Dec. 17, 1980

[30] Foreign Application Priority Data

Jun. 16, 1980 [JP] Japan ............................. 55-81011

[51] Int. Cl.³ ............................................. G02B 7/02
[52] U.S. Cl. .................................. 350/247; 350/255; 369/44; 369/45
[58] Field of Search ................. 350/247, 255; 369/44, 369/45

[56] References Cited

U.S. PATENT DOCUMENTS 4,302,830 11/1981 Hamaoka et al. ............... 350/247 X

FOREIGN PATENT DOCUMENTS

| 55-42368 | 3/1980 | Japan | 369/44 |
| 55-146635 | 11/1980 | Japan | 350/247 |
| 55-146636 | 11/1980 | Japan | 350/247 |

Primary Examiner—F. L. Evans
Attorney, Agent, or Firm—Parkhurst & Oliff

[57] ABSTRACT

An objective lens driving device for driving an objective lens and correcting a relative positional error, i.e. a tracking error between one or more information tracks recorded spirally or concentrically on a disc-shaped record medium and a light spot projected onto the record medium by means of the objective lens, comprising a supporting means for movably supporting the objective lens or its holding means in a direction perpendicular to an optical axis of the objective lens as well as the information track, first and second magnetic members arranged at both sides of the objective lens or its holding means as viewed in a direction perpendicular to the moving direction of the objective lens or its holding means and made integral therewith, first, second, third and fourth yokes each including one portion opposed through an air gap to one of the two ends of the magnetic member, first, second, third and fourth coils each wound around that portion of the yoke which is opposed to the magnetic member, and a magnetic field generation means for producing a closed loop of magnetic field passing through the first, second, third and fourth yokes as well as the first and second magnetic members.

5 Claims, 13 Drawing Figures

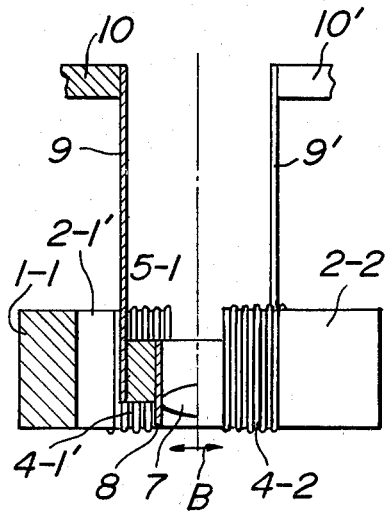
FIG. 2A
PRIOR ART
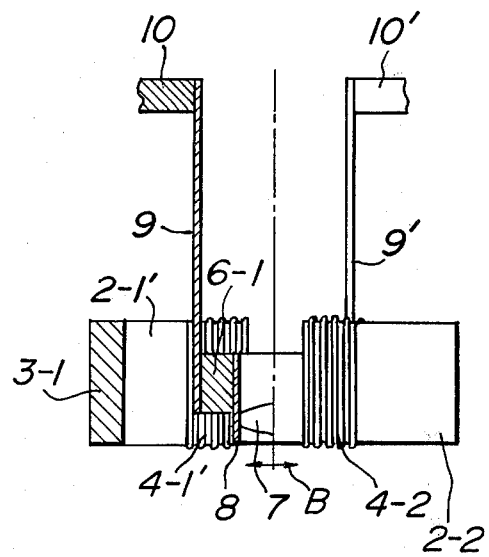
FIG. 3A
PRIOR ART
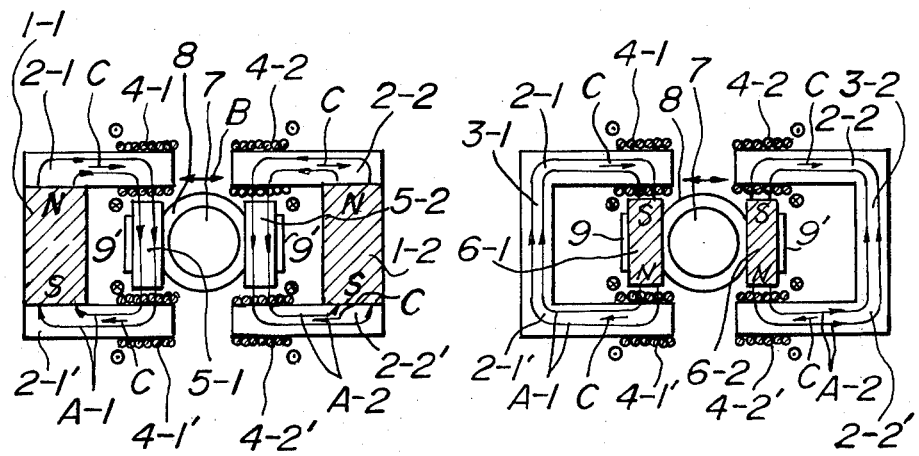
FIG. 2B
PRIOR ART
FIG. 3B
PRIOR ART

OBJECTIVE LENS DRIVING DEVICE

BACKGROUND OF THE INVENTION

1. Field of the Invention

This invention relates to an objective lens driving device which is applicable to an information reading-out apparatus for projecting a reading-out light spot onto an information track which has spirally or concentrically been recorded on a record medium, for example, and reading out such information and which can drive the objective lens in a direction perpendicular to the optical axis of the objective lens and to the information track for the purpose of correcting the relative deviation in position between the information track and the reading-out light spot projected through the objective lens onto the information track.

2. Description of the Prior Art

The above mentioned information reading-out apparatus has heretofore been well known. The record medium including the information track recorded thereon is called a video disc. On the information track of the video disc is recorded an encoded video signal or voice signal as optical information by such means as optical transmitting, reflecting and phase properties. The video disc is rotated at high speed and a laser beam emitted from a laser light source is focussed through an objective lens as a reading-out light spot. The reflected light or transmitted light modulated by the information track is detected and read out. One of the features of such a record medium is a very high density of recorded information and hence the width of each information track is very narrow and the space between successive tracks is also very narrow. As a result, the diameter of the reading-out light spot should be correspondingly very small.

In order to pick-up correctly the recorded information from such tracks having very narrow width and pitch, a mutual positional error between the reading-out light spot and the information track, i.e. a tracking error, should be reduced to as little as possible. It has been proposed to effect a so-called tracking control in which mutual displacement of the reading-out light spot and the information track is photoelectrically detected to produce a tracking error signal and the reading-out light spot is displaced in a direction perpendicular to the information track in response to the detected tracking error signal. In such a tracking mechanism heretofore proposed, use is made of an oscillating mirror inserted in an optical path from a laser light source to an objective lens, and the mirror is rotated in response to the detected tracking error signal. However, such a tracking mechanism could not attain a sufficiently high accuracy and is liable to be large in size and expensive.

In order to avoid the above mentioned drawbacks of the known tracking mechanism, it has been further proposed that the objective lens or its holder be supported by a resiliently supporting member comprising springs, e.g. leaf springs, and that the objective lens be moved in a direction perpendicular to the optical axis of the objective lens as well as to the tangential direction of the information track by means of an electromechanical transducer in response to the tracking error signal. As the electromechanical transducer, use may be made of an electromagnet, voice coil, piezoelectric element or the like. In order to obtain a good response property for tracking, the assembly should be made small in size and light in weight.

In an actual reading-out apparatus, in addition to the tracking error a so-called focussing error is produced in which the light spot could not be correctly focussed on the information track. For correcting the focussing error, provision must be made of for a focussing mechanism for displacing the objective lens in the direction of its optical axis. When the tracking mechanism is mounted on the focussing mechanism, the tracking mechanism should be smaller in size and lighter in weight for attaining an accurate focussing correction.

In a tracking mechanism which makes use of an electromagnet, a sufficient force necessary for moving the objective lens can be produced and the mechanism can be made small in size and light in weight in a relatively easy manner. However, an accurate tracking correction could not be effected, because the relation between an amount of electric current flowing through a coil of the electromagnet and an amount of displacement of the objective lens is not linear. In the tracking mechanism comprising the voice coil, miniaturization could hardly be attained. In addition, the tracking mechanism which makes use of the piezoelectric elements could not produce a sufficiently large driving force for driving the objective lens.

SUMMARY OF THE INVENTION

An object of the invention, therefore, is to provide an objective lens driving device which can move the objective lens in the tracking direction in a linear manner in response to the amount of the tracking error signal, which can produce a sufficiently large driving force necessary for obtaining excellent response, which can easily be made small in size and light in weight, and which can drive the objective lens in two-dimensions, i.e. both in the tracking and focussing directions.

A feature of the invention is the provision in an objective lens driving device for driving an objective lens and correcting a relative positional error, i.e. tracking error between an information track recorded spirally or concentrically on a record medium and a reading-out light spot projected onto the record medium by means of the objective lens, of the improvement comprising means for movably supporting the objective lens or its holding means in a direction perpendicular to an optical axis of the objective lens as well as the information track;

first and second magnetic members arranged at both sides of the objective lens or its holding means as viewed in a direction perpendicular to said moving direction of the objective lens or its holding means and made integral therewith;

first, second, third and fourth yokes each including one portion opposed through an air gap to one of the two ends of said magnetic member;

first, second, third and fourth coils each wound around that portion of said yoke which is opposed to said magnetic member; and a magnetic field generation means for producing a closed loop of magnetic field passing through said first, second, third and fourth yokes as well as said first and second magnetic members; whereby said first, second, third and fourth coils are supplied with an electric current corresponding to a tracking error signal representing said relative positional error so as to displace said first and second magnetic members and said objective lens in a direction perpendicular to its optical axis and to the information track, thereby correcting the tracking error.

Further objects and features of the invention will be fully understood from the following detailed description with reference to the accompanying drawings, wherein:

BRIEF DESCRIPTION OF THE DRAWINGS

FIG. 2A is a front elevational view of a further example of a known objective lens driving device, partly shown in section;

FIG. 2B is its plan view;

FIG. 3A is a front elevational view of a still further example of a known objective lens driving device, partly shown in section;

FIG. 3B is its plan view;

DETAILED DESCRIPTION OF THE PREFERRED EMBODIMENTS

Figure 1A:
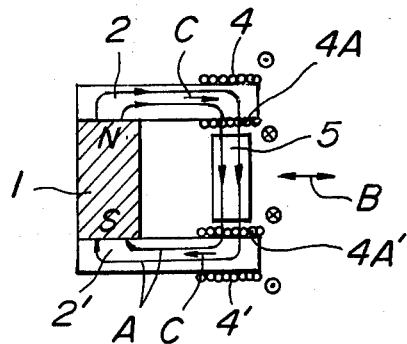
FIG. 1A is a diagrammatic view of an example of a known objective lens driving device.
Figure 1B:
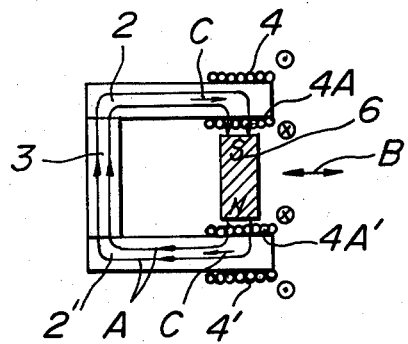
FIG. 1B is a diagrammatic view of another example of a known objective lens driving device.

FIGS. 1A and 1B show two examples of a known objective lens driving device. In an example shown in FIG. 1A, to a permanent magnet 1 are connected first and second stationary yokes 2 and 2' so as to close a magnetic path shown by an arrow A. Between the first and second stationary yokes 2 and 2' is interposed a movable magnetic member 5 composed of a magnetic material and movable in the direction shown by arrows B. Around the first and second stationary yokes 2 and 2' are wound first and second coils 4 and 4', respectively. If the leakage of magnetic flux is absent, opposed coil portions 4A and 4A' of the first and second coils 4 and 4' are exposed to the magnetic field produced from the permanent magnet 1. That is, if the yokes 2, 2' are square in section, those coil portions of the first and second coils 4, 4' which are located at the other three non-opposed planes of the yokes 2, 2' are not interlinked by the magnetic flux. If an electric current flows through these coils located in the magnetic field, these coils are subjected to forces. If the electric current flows through the first and second coils 4 and 4' in a direction shown by symbols $\otimes$, $\odot$, the coil portions 4A and 4A' are subjected to forces. But, the coils 4, 4' are not moved since they are wound around the stationary yokes, respectively. As a result, the movable magnetic member 5 is subjected to the force and moved in one of two directions shown by the arrows B, for example, to the left. If the direction of the current flowing through the first and second coils 4 and 4' is reversed, the movable magnetic member 5 is moved to the opposite direction, that is, to the right.

In another example of a known objective lens driving device shown in FIG. 1B, first and second stationary yokes 2 and 2' are connected through a third stationary yoke 3 instead of the permanent magnet 1 shown in FIG. 1. In order to cause the magnetic flux to pass through these yokes 2, 2', 3, a movable magnetic member 6 is composed of a permanent magnet and arranged in an air gap formed between the first and second yokes 2 and 2' such that the movable magnetic member 6 is movable in the directions shown by arrows B and that a magnetic path shown by an arrow A is formed. Even in this case, if the current flows through the first and second coils 4 and 4' wound around the first and second yokes 2 and 2', respectively, it is possible to displace the movable magnetic member 6 in the directions shown by arrows B. The first, second and third stationary yokes 2, 2', 3 may be made integral into one body. The third stationary yoke 3 may be replaced by the permanent magnet as shown in FIG. 1A.

FIGS. 2A and 2B show a further example of a known objective lens driving device which makes use of two sets of driving means shown in FIG. 1A and opposed to each other such that the magnetic fluxes are distributed symmetrically with respect to the plane formed by the optical axis of the objective lens and by the information track. In FIGS. 2A and 2B, an objective lens 7 is enclosed in a lens holding frame 8 formed of a non-magnetic material. To this lens holding frame 8 are secured movable magnetic members 5-1 and 5-2 each formed of a magnetic material.

FIGS. 3A and 3B show a still further example of a known objective lens driving device in which each of movable magnetic members 6-1 and 6-2 is formed of a permanent magnet.

In the examples shown in FIGS. 2 and 3, the movable magnetic members are made symmetrical with respect to a plane defined by the optical axis of the objective lens 7 and the information track. In addition, to each of these movable magnetic members 5-1 and 5-2, 6-1 and 6-2 is secured one end of each of a pair of leaf springs 9 and 9' arranged symmetrically with respect to the above mentioned plane, the other ends of these leaf springs 9 and 9' being secured to fixed members 10 and 10', thereby supporting the objective lens or the like in a manner displaceable in the direction shown by arrows B. Provision is made for two sets of driving means operative in cooperation with the movable magnetic members 5-1 and 5-2, 6-1 and 6-2, each set of the driving means being opposed to each other and the same in construction as the driving means shown in FIGS. 1A and 1B, respectively. In the example shown in FIGS. 3A and 3B, the first, second and third stationary yokes 2-1, 2-1' and 3-1 are made integral into one body.

In the examples shown in FIGS. 1A and 1B, if current flows through the first and second coils 4 and 4' in the direction shown therein, a magnetic field shown by an arrow C is induced in the first and second stationary yokes 2 and 2'. This induced magnetic field C is the same in direction as the magnetic field produced by the permanent magnets 1 and 6 and hence the total amount of the magnetic flux is increased. On the contrary, if the direction of current flowing the coils 4 and 4' is reversed, the direction of the magnetic field induced becomes opposite to the direction shown by the arrow C and hence the total amount of the magnetic flux is decreased. As a result, the relation between the current flowing through the coils and the displacement of the movable magnetic members 5 and 6 becomes non-linear.

In the examples shown in FIGS. 2A, 2B and 3A, 3B, if the current flows through the coils 4-1, 4-1', 4-2, 4-2' in the direction shown by the symbols $\otimes$, $\odot$, the movable magnetic members 5-1 and 5-2, 6-1 and 6-2 are displaced in the same direction (one of the directions shown by arrows B). But, if the magnetic flux induced in the first set of stationary yokes 2-1 and 2-1' and shown by the arrow C is the same in direction as the magnetic field produced by the permanent magnets 1-1, 6-1 and shown by an arrow A-1, the magnetic flux induced in the second set of stationary yokes 2-2 and 2-2' becomes opposite in direction to the magnetic field produced by the permanent magnets 1-2, 6-2 and shown by arrow A-2. As a result, the first set and the second set become so related that these first and second sets are operative to compensate for each other, so that the relation between the current flowing through the coils and the amount of displacement of the movable magnetic member becomes linear. In addition, it is possible to drive the movable magnetic member by means of a large amount of force.

Figure 4A:
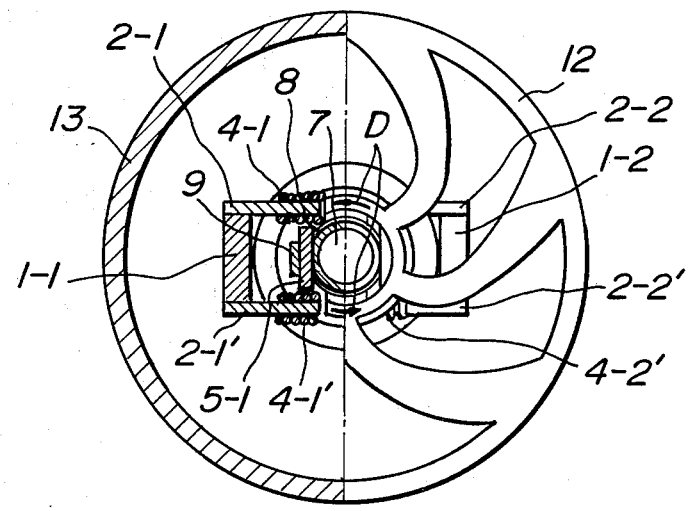
FIG. 4A is a plan view of another example of a known objective lens driving device for driving the objective lens in two dimensions, partly shown in section.
Figure 4B:
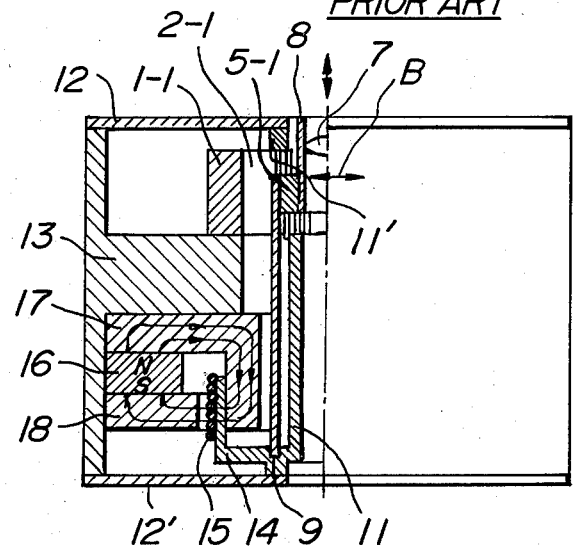
FIG. 4B is its front elevational view.

FIGS. 4A and 4B show another example of a known objective lens driving device which can displace the objective lens in two-dimensions, that is, in both directions of the above mentioned tracking error correction and the optical axis of the objective lens, i.e. focussing correction. In the present example, as a driving mechanism for moving the objective lens 7 in the tracking error correction direction, use may be made of one of the driving mechanisms shown in FIGS. 2 and 3. In the present example, use is made of the driving mechanism shown in FIG. 2.

An objective lens 7, lens holding frame 8 and movable magnetic members 5-1, 5-2 formed of a magnetic material are secured to an intermediate frame 11 through a pair of leaf springs 9, 9' arranged symmetrically with respect to the optical axis of the objective lens 7 and displaceable in the directions shown by arrows B only. This intermediate frame 11 is secured to an outer frame 13 through a pair of spiral-shaped circular springs 12 and 12'. As a result, the intermediate frame 11 is displaceable in the direction of the optical axis of the objective lens 7. The stationary yokes 2-1, 2-1', 2-2, 2-2' and permanent magnets 1-1, 1-2 cooperating with the movable magnetic members 5-1 and 5-2 are held by the outer frame 13. As a result, to the intermediate frame 11 movable in the direction of the optical axis are secured the objective lens 7, lens holding frame 8 and movable magnetic members 5-1, 5-2 only through the leaf springs 9, 9', so that the assembly as a whole is light in weight. It is a matter of course that the width of the stationary yokes 2-1, 2-1', 2-2, 2-2' in the direction of the optical axis is made larger than the width of the movable magnetic members 5-1, 5-2 in order not to change the magnetic flux interlinked with the movable magnetic members 5-1, 5-2. In order to cause the intermediate frames 11, 11' to displace in the direction of the optical axis and hence effect focussing, a focussing coil 15 is wound around a bobbin 14 made integral with the intermediate frames 11, 11' and a permanent magnet 16. stationary yokes 17 and 18 cooperating with the focussing coil 15 are secured to the outer frame 13.

As seen from FIGS. 4A and 4B, the magnetic path formed by the objective lens driving means is concentrically symmetrical with respect to the optical axis. As a result, the distribution of the magnetic flux leaked from the magnetic circuit is also concentrically symmetrical with respect to the optical axis. The focussing error signal component and tracking error signal component contain the largest amount of frequency component which is the same as the rotational frequency of the record medium, and as a result, the resonance frequency of the objective lens driving means and the resonance frequency of the tracking driving means are set such that these frequencies are coincident with the rotational frequency of the record medium.

The mass (on the order of 3 gr.) of the movable magnetic member of the focussing mechanism is larger than the mass (in the order of 0.5 gr.) of the movable magnetic member of the tracking mechanism. As a result, the magnetic flux produced by the permanent magnet 16 is sufficiently larger than the magnetic flux generated from the permanent magnets 1-1, 1-2. Thus, the influence of the leakage magnetic flux exerted from the focussing mechanism to the tracking mechanism is far larger than that exerted from the tracking mechanism to the focussing mechanism. The leakage magnetic flux of the focussing mechanism is produced concentrically symmetrical with respect to the optical axis, whereas the distribution of magnetic flux of the tracking mechanism is symmetrical with respect to the plane defined by the optical axis of the objective lens 7 and by the direction of the information track, but undergoes the influence of the leakage flux from the focussing mechanism and hence becomes unsymmetrical with respect to the plane defined by the optical axis of the objective lens 7 and the direction shown by the arrows B. For example, if the magnetic flux passing the stationary yokes 2-1 and 2-2 is increased, the magnetic flux passing the yokes 2-1' and 2-2' is decreased.

Under such condition, if the objective lens 7, lens holding frame 8, spring 9, 9', intermediate frame 11, bobbin 14 and coil 15 are displaced toward the focussing direction, these movable members held by the spiral-shaped circular springs 12, 12' are rotated about the optical axis from the balanced position in the direction shown by arrows D and displaced toward the optical axis of the objective lens 7. In addition, the movable magnetic members 5-1, 5-2 are subjected not only to the force in the direction shown by the arrows B but also to the force for attracting the movable magnetic members 5-1, 5-2 to the stationary yokes 2-1, 2-1', 2-2, 2-2'. This attracting force is not linearly changed as a function of the width of the air gap formed between the movable magnetic members 5-1, 5-2 and the stationary yokes 2-1, 2-1', 2-2, 2-2', but is increased as the width of the air gap becomes short. In addition, the pair of leaf springs 9, 9' for suspending the movable members 5-1, 5-2 have a sufficiently high resistance against the attracting force, but have a relatively low resistance against the torsional displacement. As a result, if the movable magnetic members 5-1, 5-2 are rotated and displaced in the direction of the optical axis so as to shorten the distance of the air gap and if the attracting force exceeds the restoring force of the torsional displacement of the leaf springs 9, 9', the movable magnetic members 5-1, 5-2 are attracted to the stationary yokes. In addition, the attracting force of the stationary yokes with respect to the plane defined by the optical axis of the objective lens 7 and the direction shown by the arrows B becomes different due to the influence of the leakage of magnetic flux from the focussing mechanism. As a result, the attracting action of the stationary yokes is increased, thereby rendering the precise tracking control and focussing control impossible. In addition, in order to effect the tracking control, the magnetic field A-1 produced by the permanent magnets 1-1, 6-1 is required to be equal to the magnetic field A-2 produced by the permanent magnets 1-2, 6-2. But, the use of the measure of making these magnetic fields A-1, A-2 equal is very difficult from the manufacturing standpoint of view.

Figure 5:
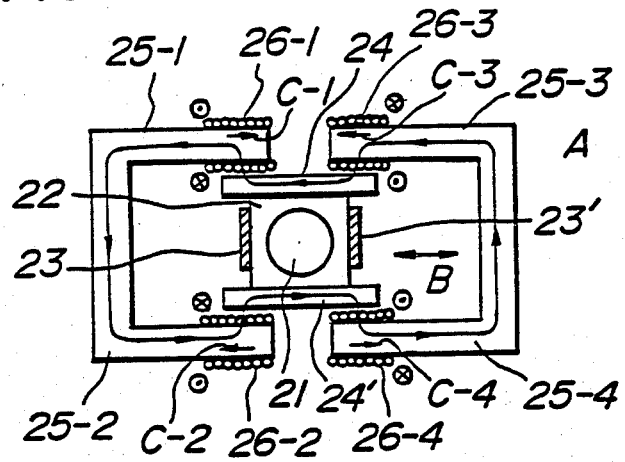
FIG. 5 is a diagrammatic view of an embodiment of an objective lens driving device according to the invention.

FIG. 5 shows an embodiment of an objective lens driving device according to the invention. In the present embodiment, an objective lens 21 is held in a holding frame 22 formed of a non-magnetic material. The objective lens 21 and its holding frame 22 are supported by means of a pair of leaf springs 23, 23' and made movable in the direction shown by arrows B and perpendicular to the information track (not shown). Each of the leaf springs 23, 23' is secured at its one end to one side of the holding frame 22 and at the other end to a stationary member not shown. The holding frame 22 is provided at those sides thereof which are located in the tracking direction with a pair of magnetic members 24, 24'. First, second, third and fourth yokes 25-1, 25-2, 25-3 and 25-4 are secured to a suitable stationary member not shown such that one portion of each of both ends of those yokes is opposed through an air gap to one portion of each of both ends of the magnetic members 24, 24'. Around those portions of these first, second, third and fourth yokes 25-1, 25-2, 25-3 and 25-4 which are opposed to the pair of magnetic members 24, 24' are wound first, second, third and fourth coils 26-1, 26-2, 26-3 and 26-4, respectively. Provision is made of a magnetic field generation means for generating a closed loop magnetic field A passing the first, second, third and fourth yokes 25-1, 25-2, 25-3 and 25-4 and the pair of magnetic members 24, 24'. In the embodiment shown in FIG. 5, in order to provide such magnetic field generation means, two channel-shaped yokes, one of which includes the first and second yokes 25-1 and 25-2 made integral into one body while the other channel-shaped yoke includes the third and fourth yokes 25-3 and 25-4 made integral into one body, are opposed to each other and any portion of these channel-shaped yokes or any portion of the pair of magnetic members 24, 24' is magnetized or formed into a permanent magnet so as to generate a closed loop magnetic field A. In the present embodiment, to the first, second, third and fourth coils 26-1, 26-2, 26-3 and 26-4 are supplied electric currents which correspond to the tracking error signal such that the distribution of magnetic field produced by these coils becomes symmetrical with respect to the optical axis of the objective lens 21. In FIG. 5, the direction of these electric currents is shown by symbols ⊗ , ⊙.

In this way, if the magnetic field A produced by the magnetic field generation means passes through the closed loop passing the first, second, third and fourth yokes 25-1, 25-2, 25-3 and 25-4 and the pair of magnetic members 24, 24', the left and right magnetic field strengths become equal with each other with respect to the optical axis of the objective lens 21, so that the magnetic field generation means is not required to be adjusted and hence results in extreme ease of manufacture. In addition, the electric currents supplied to the first, second, third and fourth coils 26-1, 26-2, 26-3 and 26-4 produce magnetic fields C-1 and C-3, C-2 and C-4 which are opposed in direction from each other, so that the known devices shown in FIGS. 2 and 3 can be incorporated into the voice coil type focussing driving mechanism shown in FIG. 4 without exerting any influence of leakage magnetic field produced. As a result, it is possible to effect tracking control in a highly precise manner.

Figure 6:
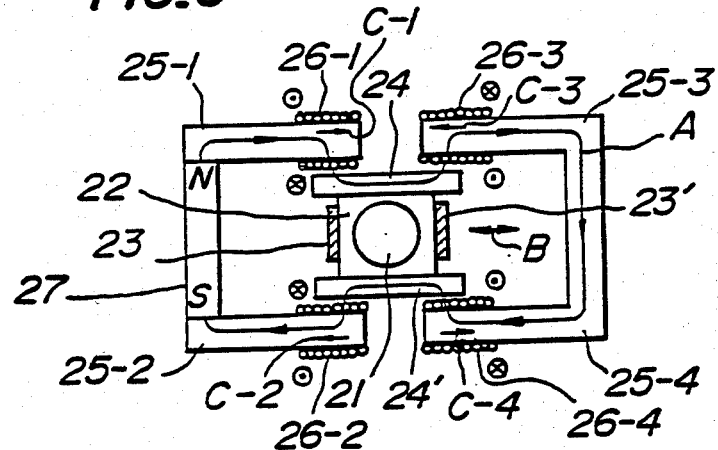
FIG. 6 is a diagrammatic view of another embodiment of an objective lens driving device according to the invention.

FIG. 6 shows another embodiment of an objective lens driving device according to the invention in which the first and second yokes 25-1 and 25-2 are connected with each other through a permanent magnet 27 which is the magnetic field generation means. In the present embodiment, if the tracking control current is supplied to the first, second, third and fourth coils 26-1, 26-2, 26-3 and 26-4 in the direction shown by the symbols ⊗ , ⊙, magnetic fields C-1, C-2, C-3 and C-4 are produced in these coil portions such that the strength of the magnetic field at the right half becomes weak and the strength of the magnetic field at the left half becomes strong, thereby moving the objective lens 21, holding frame 22 and pair of magnetic members 24, 24' toward the left in the direction shown by the arrow B. If the direction of the tracking control current supplied to the first, second, third and fourth coils 26-1, 26-2, 26-3 and 26-4 is reversed, the above mentioned relation between the strength of the magnetic field and the coil portion becomes reversed, so that the movable members inclusive of the objective lens 21 or the like are moved toward the right in the direction shown by the arrows B.

Figure 7:
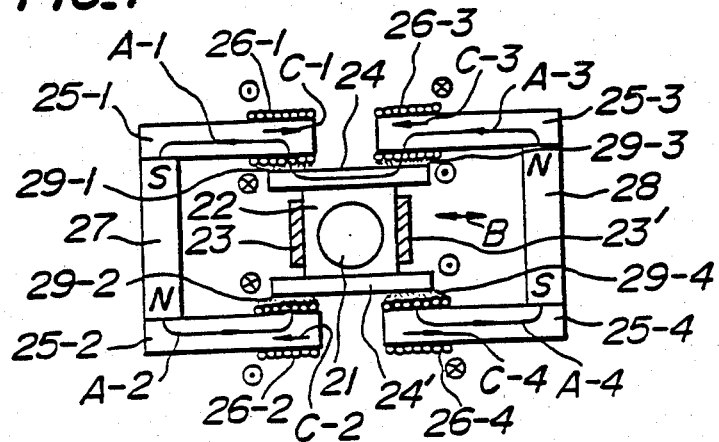
FIG. 7 is a diagrammatic view of a further embodiment of an objective lens driving device according to the invention.

FIG. 7 shows a further embodiment of an objective lens driving device according to the invention. In the present embodiment, two permanent magnets 27, 28 are connected between the first and second yokes 25-1 and 25-2 and between the third and fourth yokes 25-3 and 25-4, respectively, such that these two permanent magnets are symmetrical with respect to the optical axis of the objective lens 21, thereby constituting a magnetic field generation means and hence generating closed loop magnetic fields A-1, A-2, A-3 and A-4. In addition, magnetic fluids 29-1, 29-2, 29-3 and 29-4 made by Ferrofluidics Co. and available in the market under the trade name of Ferrofluid are filled in the air gaps formed between the first, second, third and fourth coils 26-1, 26-2, 26-3 and 26-4 and the pair of magnetic members 24 and 24', respectively. The present embodiment is different in these two features from the previous embodiment of the objective lens driving device shown in FIG. 6. In the present embodiment, if the current corresponding to the tracking error signal flows through the first, second, third and fourth coils 26-1, 26-2, 26-3 and 26-4 in the direction shown by symbols ⊗ , ⊙, the magnetic fields A-3, C-3 and A-4, C-4 are the same in direction so as to make these magnetic fields strong, whereas the magnetic fields A-1, C-1 and A-2, C-2 are opposed from each other in direction so as to weaken these magnetic fields. If the direction of electric current flowing through those coils is made opposite, then the above mentioned magnetic fields become opposite in strength. If the vertical cross-sectional configuration of each of the first, second, third and fourth yokes 25-1, 25-2, 25-3 and 25-4 is square, one surface of each of the first, second, third and fourth coils 26-1, 26-2, 26-3 and 26-4 is exposed to the magnetic field. As a result, the objective lens 21 is driven in the direction shown by arrows B by means of a sufficiently large amount of force. In addition, the magnetic fields produced when the first, second, third and fourth coils 26-1, 26-2, 26-3 and 26-4 are supplied with current are symmetrical with respect to the optical axis of the objective lens 21, so that even when the objective lens driving device shown in FIG. 7 is incorporated into the voice coil type tracking driving mechanism, the distribution of tracking and focussing control magnetic fields becomes symmetrical with respect to each other and hence is not subjected to the mutual reaction of the induced magnetic field. As a result, it is possible to sufficiently maintain the linearity of the movement of the objective lens 21 against the induced magnetic field. In addition, the magnetic fluids 29-1, 29-2, 29-3 and 29-4 filled in the air gaps formed between the first, second, third and fourth coils 26-1, 26-2, 26-3 and 26-4 and the pair of magnetic members 24, 24' exist in the air gap in a stable state due to the strong magnetic field in the air gap. As a result, these magnetic fluids function to produce a damping effect due to the viscosity thereof. In addition, the presence of the magnetic fluids serves to increase the efficiency of the magnetic flux even though the air gap is wide.

Figure 8A:
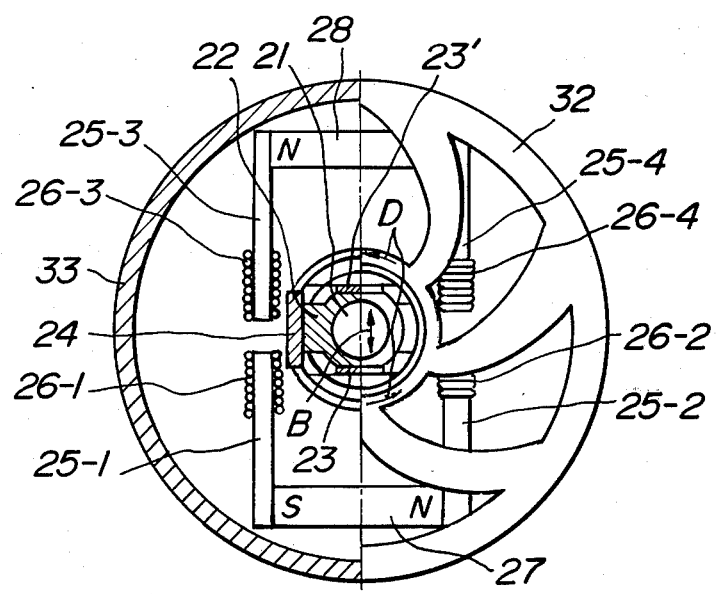
FIG. 8A is a plan view of a still further embodiment of an objective lens driving device according to the invention which can drive the objective lens in two-dimensions, partly shown in section.
Figure 8B:
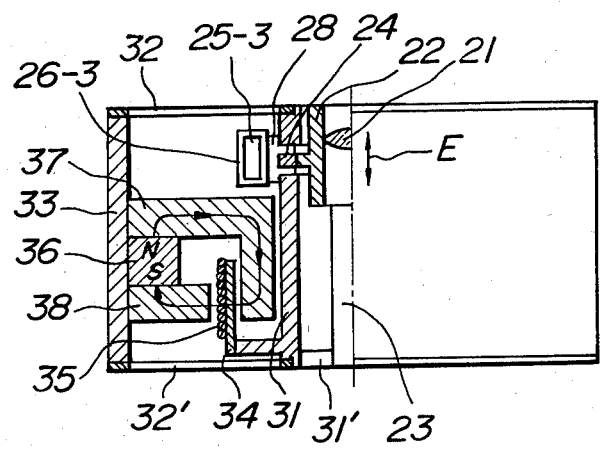
FIG. 8B is its front elevational view.

FIGS. 8A and 8B show a still further embodiment of an objective lens driving device according to the invention which can displace an objective lens 21 in two-dimensions, i.e. in the above mentioned tracking error correction direction and in the focussing correction direction aligned with the optical axis of the objective lens. In the present embodiment, the focussing drive mechanism for moving the objective lens 21 in its optical axis is composed of the voice coil type focussing drive mechanism shown in FIG. 4. The driving mechanism for moving the objective lens 21 in the tracking error correction direction may be composed of either one of the driving mechanisms shown in FIGS. 6 and 7. In the present embodiment, use is made of the driving mechanism shown in FIG. 7.

An objective lens 21, lens holding frame 22 and pair of magnetic members 24, 24' are secured to a portion 31' projected from an intermediate frame 31 through a pair of leaf springs 23, 23' symmetrically arranged with respect to the optical axis of the objective lens 21 such that all of these members are displaceable in directions shown by arrows B. An intermediate frame 31 made integral with a projecting portion 31' is secured to an outer frame 33 by means of a pair of spiral-shaped circular springs 32 and 32'. As a result, the intermediate frame 31 is also displaceable in the direction E of the optical axis of the objective lens 21. First, second, third and fourth yokes 25-1, 25-2, 25-3 and 25-4 cooperating with the pair of magnetic members 24, 24' and permanent magnets 27, 28 are held by the outer frame 33. As a result, only the objective lens 21, lens holding frame 22 and magnetic members 24, 24' are secured through the leaf springs 23, 23' to the intermediate frame 31 movable in the direction E of the optical axis, thereby rendering the device as a whole light in weight. It is a matter of course that the width in the optical axis of the first, second, third and fourth yokes 25-1, 25-2, 25-3 and 25-4 is made larger than the width of the magnetic members 24, 24' in the optical direction in order to prevent the magnetic flux passing through the magnetic members 24, 24' from being changed when the magnetic members 24, 24'are moved in the axial directions E. In order to displace the intermediate frame 31 in the direction of the optical axis and effect the focussing, a focussing voice coil 35 is wound around a bobbin 34 made integral with the intermediate frame 31 and a permanent magnet 36 and stationary yokes 37 and 38 cooperated with the voice coil 35 are secured to the outer frame 33.

In such construction, the leakage fluxes from the focussing mechanism are concentrically symmetrical with respect to the optical axis of objective lens 21 and the distribution of magnetic fluxes from the tracking mechanism is symmetrical with respect to the optical axis of objective lens. As a result, if the magnetic flux passing through the first and second yokes 25-1 and 25-2 is increased or decreased under the influence of the leakage flux, the magnetic flux passing through the third and fourth yokes 25-3 and 25-4 is decreased or increased. That is, the distribution of magnetic flux becomes symmetrical with respect to the optical axis. If the objective lens 21 is displaced in the direction of the optical axis, the magnetic members 24, 24' are rotated in a direction shown by an arrow D in FIG. 8. In this case, the air gap defined by the second yoke 25-2 and the magnetic member 24' and the air gap defined by the third yoke 25-3 and the magnetic member 24 become short in width, respectively, whereas the air gap defined by the first yoke 25-1 and the magnetic member 24 and the air gap defined by the fourth yoke 25-4 and the magnetic member 24' become large in width, respectively. As a result, the magnetic flux passing through the second and third yokes 25-2 and 25-3 whose air gaps become narrow becomes small under the influence of the leakage flux from the focussing mechanism, whereas the magnetic flux passing through the first and fourth yokes 25-1 and 25-4 whose air gaps become wide becomes large under the influence of the same leakage flux. Accordingly, the distribution of magnetic flux is symmetrical with respect to the optical axis as it was before. The attractive force of the second and third yokes 25-2 and 25-3 is decreased. The magnetic members 24, 24' are effectively displaceable in two dimensions, i.e. not only in the optical axis directions E but also in the directions B perpendicular to the direction of the optical axis and information track. Thus, the device can effect focussing control and tracking control in a precise manner.

If the magnetic fluid is filled in the air gap defined between the magnetic member 24, 24' and the first, second, third and fourth coils 26-1, 26-2, 26-3 and 26-4 as shown in FIG. 7, damping action is produced even in the focussing direction when the objective lens 21 is driven in two dimensions.

The invention is not limited to the above mentioned embodiments only, but various modifications and changes may be made. For example, in the embodiment shown in FIG. 8, the first, second, third and fourth yokes 25-1, 25-2, 25-3 and 25-4 and permanent magnets 27, 28 are secured to the outer frame 32, but these members may be secured through a non-magnetic material to the stationary yoke 37 for the focussing control. In addition, the pair of magnetic members 24, 24' may directly be secured to the objective lens 21 without using the lens holding frame 22.

To the objective lens holding frame may be secured one end of an arm so as to locate the objective lens outside the plane formed by the closed magnetic field loop. In this case, the arm is provided at the other end thereof with a pair of magnetic members. As a result, it is possible to move the objective lens in the tracking error correction direction and focussing error correction direction. In addition, the closed loop magnetic path may be provided therein with a suitable air gap so as to adjust the air gaps defined by the magnetic members 24, 24' and the first, second, third and fourth yokes 25-1, 25-2, 25-3 and 25-4.

In the above mentioned embodiments, the objective lens driving device according to the invention has been applied to the information reading-out apparatus, but it may also be applied to an apparatus for optically recording information on a record medium while maintaining the distance between the information track which has been recorded on the record medium and the center of a light spot focussed to the position to be recorded on the record medium constant in the radial direction of the record medium.

As stated hereinbefore, the objective lens driving device according to the invention has a number of advantages. In the first place, the device is simple in construction, reliable in operation and less expensive. Secondly, the device can form a uniform magnetic field for the tracking control. Third, the relation between the current flowing through the first, second, third and fourth coils and corresponding to the tracking error and the amount of movement of the objective lens is made linear, so that the tracking error can be corrected in a precise manner. Fourth, it is possible to obtain a sufficiently large amount of force for moving the objective lens with a device which is small in size and light in weight. Fifth, the distribution of magnetic field of the driving means for the tracking control is made symmetrical with respect to the optical axis of the objective lens, so that even when the objective lens is driven in two dimensions, the objective lens can precisely be displaced in respective directions. Finally, the magnetic fluid filled in the air gap defined between the first, second, third and fourth coils and the pair of magnetic members can improve the damping characteristic.

What is claimed is:

1. In an objective lens driving device for driving an objective lens and correcting a relative positional error, i.e. a tracking error between an information track recorded spirally or concentrically on a record medium and a light spot projected onto the record medium by means of the objective lens, the improvement comprising a supporting means for movably supporting said objective lens or its holding means in a direction perpendicular to an optical axis of the objective lens as well as the information track;

first and second magnetic members arranged at both sides of the objective lens or its holding means as viewed in a direction perpendicular to said moving direction of the objective lens or its holding means and made integral therewith;

first, second, third and fourth yokes each including one portion opposed through an air gap to one of the two ends of one of said magnetic members;

first, second, third and fourth coils each wound around that portion of said yoke which is opposed to said one end of one of said magnetic members; and a magnetic field generation means for producing a closed loop of magnetic field passing through said first, second, third and fourth yokes as well as said first and second magnetic members;

whereby said first, second, third and fourth coils are supplied with an electric current corresponding to a tracking error signal representing said relative positional error so as to displace said first and second magnetic members and said objective lens in a direction perpendicular to its optical axis and to the information track, thereby correcting the tracking error.

2. The device according to claim 1, wherein magnetic fields produced from said first, second, third and fourth coils are made symmetrical with respect to a center of said closed loop of magnetic field produced from said magnetic field generation means.

3. The device according to claim 1, wherein said first, second, third and fourth yokes around which are wound said first, second, third and fourth coils, respectively, as well as said magnetic field generation means for producing a closed loop of magnetic field passing through said yokes and said first and second magnetic members are mounted on a stationary member and said objective lens or its holding means and said supporting means are mounted on a focussing mechanism for displacing said movable members in a direction of the optical axis of said objective lens, whereby said objective lens is displaceable in two-dimensions, i.e. in its optical axis direction and a direction perpendicular to said optical axis direction and to said information track.

4. The device according to claim 3, wherein said objective lens driving means is so constructed that the optical axis of said objective lens is aligned with the center of said closed loop of magnetic field, said focussing mechanism is of a voice coil type and the distribution of the magnetic field for moving said objective lens in the direction of its optical axis is made symmetrical with respect to the optical axis.

5. The device according to claim 4, wherein a magnetic fluid is filled in a space formed between each of said first and second magnetic members and each of said first, second, third and fourth coils.

* * * * *